United States Patent [19]

Russell et al.

[11] 4,107,144

[45] Aug. 15, 1978

[54] PHENOLIC ANTIOXIDANTS WITH POLYMER TAILS

[75] Inventors: Kenneth E. Russell; Linda G. M. C. Vail, both of Kingston, Canada

[73] Assignee: Canadian Patents and Development Limited, Ottawa, Canada

[21] Appl. No.: 787,935

[22] Filed: Apr. 15, 1977

[30] Foreign Application Priority Data

May 20, 1976 [CA] Canada .................................. 252939

[51] Int. Cl.$^2$ ...................... C08F 232/00; C08L 9/06; C08F 8/02; C08L 4/00
[52] U.S. Cl. .............................. 526/212; 260/45.95 R; 260/45.95 D; 260/45.95 N; 260/45.95 C; 260/45.95 H; 526/346; 526/347; 526/348; 528/205
[58] Field of Search ................ 260/45.95 H, 45.95 R, 260/45.95 N, 45.95 C, 47 UA, 47 VP, 45.95 D

[56] References Cited

U.S. PATENT DOCUMENTS

| | | | |
|---|---|---|---|
| 2,831,898 | 4/1958 | Ecke et al. ..................... | 260/45.95 H |
| 2,975,217 | 3/1961 | Spacht ........................... | 260/45.95 H |
| 2,984,648 | 5/1961 | Williams et al. ............... | 260/45.95 H |
| 3,453,731 | 8/1969 | Ecke et al. ..................... | 260/45.95 H |
| 3,477,991 | 11/1969 | Patton et al. .................. | 260/47 UA |
| 3,496,128 | 2/1970 | Casey et al. ................... | 260/45.95 H |
| 3,502,629 | 3/1970 | Matthews ...................... | 260/45.95 H |
| 3,953,402 | 4/1976 | Kline .............................. | 260/47 UA |
| 3,962,187 | 6/1976 | Kline .............................. | 260/47 UA |
| 3,993,714 | 11/1976 | Kanagawa et al. ............ | 260/47 UA |
| 4,010,140 | 3/1977 | Bullard ........................... | 260/47 UA |

OTHER PUBLICATIONS

Billmeyer J P S Ptc, #8, 161-178, (1965).

Primary Examiner—Herbert J. Lilling
Attorney, Agent, or Firm—Alan A. Thomson

[57] ABSTRACT

Non-volatile antioxidants are prepared from dialkylphenols and selected vinylic monomers which polymerize cationically with acidic Lewis acid or Friedel-Crafts catalyst systems and attach to the phenolic ring. Operative phenolic antioxidants include 2,6-dialkylphenols particularly 2,6-ditertiarybutyl and 2,6-diisopropylphenol. Suitable vinylic monomers include isobutene and styrene. With 2,6-dialkylphenols the polymer chains attach to the 4-position of the phenol. The molecular weight of the chain or tail is controlled to be within about 1000 to 5000 preferably about 2000-3500, for a balance of anti-oxidant activity and immobility in the matrix polymer.

22 Claims, No Drawings

PHENOLIC ANTIOXIDANTS WITH POLYMER TAILS

FIELD OF THE INVENTION

This invention is concerned with phenolic antioxidants adapted for use in polymers, plastics and rubbers. A polymer tail is attached to the benzene ring of a dialkylphenol, providing reduced volatility, migration or "bleeding," and in some cases improved compatibility with matrix polymer.

DESCRIPTION OF THE PRIOR ART

Conventional phenolic antioxidants such as 4-methyl-2,6-ditertiarybutylphenol are relatively volatile and mobile; they can migrate or be lost from materials such as plastics and rubber during processing or use, particularly at elevated temperatures. The base material to be protected is thus not protected by the antioxidant for as long a period as is desirable. Developments in polyolefin stabilizer technology have been concerned with the persistence of the stabilizer in the polymer under a wide range of environmental conditions. It is known that antioxidants containing the same functional group and differing only in molecular weight show very different activities when evaluated at elevated temperatures or under conditions where the polymer is subjected to extraction by oils or detergents.

The mobility and volatility have been reduced to some extent by increasing the molecular weight of the antioxidant. Larger molecules having two or three phenolic rings attached together, e.g. bis-phenols with lower alkyl substituents, have higher stabilizing coefficients and lower volatility. It is also known to incorporate into 2,6-dialkylphenols in the 4-position, larger groups such as n-butyl, bulky alkenyl and aromatic groups, and certain sulfur and/or phosphorus-containing groups. These groups tend to reduce mobility and loss of antioxidant and can bestow special properties for particular uses. Even with such bulky groups, the compounds have a fair degree of mobility and in certain applications particularly at higher temperatures offer inadequate protection.

As an alternative approach, loss of antioxidants from elastomers has been reduced by binding them chemically to the elastomer molecule, e.g. by copolymerization in the presence of a selected copolymerizable phenolic antioxidant. Such chemically-bound antioxidants have not yet seen much commercial use (it is believed this is due to relatively high costs).

Thus there is a need for a substantially immobile and non-volatile phenolic antioxidant able to be compounded with and having good compatibility with the polymeric material to be protected.

SUMMARY OF THE INVENTION

We have prepared phenolic antioxidants having a polymeric chain attached directly to the benzene ring by cationically polymerizing selected vinylic monomers in the presence of an acid catalyst. The polymerization is controlled to form chains or tails of average molecular weights from about 1000 to 5000. Polymer chains have been found to be attached to the benzene ring of the phenol (not to a side chain alkyl group thereof). The chains attach in the vacant 4 or 6 position on the ring. These phenolic antioxidants with polymer tails have very low volatility and mobility in polymeric matrices, yet have very adequate stabilizing coefficients (or antioxidant activity).

In particular, dialkylphenol antioxidants are provided, having attached to the ring, a vinylic polymer tail of molecular weight from about 1000 to about 5000, said vinylic polymer being derived from vinyl monomers which polymerize cationically with a Lewis acid or Friedel-Crafts catalyst.

These phenolic-with-polymer-tail compounds are prepared by steps comprising (a) mixing a dialkylphenol antioxidant, a vinylic monomer able to polymerize cationically, a Friedel-Crafts or Lewis acid catalyst, and an aprotic solvent for the mixture, (b) polymerizing said monomer cationically and stopping the polymerization when the polymer molecular weight is within the range of about 1000 to 5000, and (c) recovering the dialkylphenol-bound polymer compound from the reaction mixture.

DETAILED DESCRIPTION AND PREFERRED EMBODIMENTS

The starting dialkylphenol can be any phenolic antioxidant having two alkyl or cycloalkyl groups attached to the ring. These alkyl groups are usually attached in the 2 and 6-positions which is preferred to the 2 and 4 positions. The alkyl groups can have from 2 to 8 carbon atoms, with tertiary butyl or isopropyl usually being preferred. Suitable starting compounds include 2,6-di-t-butylphenol, 2,6-diisopropylphenol, 2,6-di-t-octylphenol and 2,6-dicyclohexylphenol.

Instead of the single ring phenols, similar alkyl-substituted diphenols or bisphenols can be used provided there is a vacant 4 or 6 position on one or more benzene rings. Suitable polynuclear phenols include 6,6'-dialkyl-2,2'-biphenol, 2,2'-dialkyl-4,4'-isopropylidenediphenol, 6,6'-dialkyl-2,2'-methylenediphenol and dialkyl-2,4'-ethylenediphenol.

The vinylic monomer must be able to polymerize cationically with acid catalysts. Under appropriate conditions the growing polymer chain will attach to a vacant 4 or 6 position on the benzene ring of the phenol compound. Suitable monomers include isobutene, styrene, propene, pentenes and butene-1. Preferred are isobutene and styrene. These monomers can be copolymerized to form the attached polymer chain, as well as homopolymerized. Desirably, the monomer will be chosen with a view to optimum compatibility with the base polymer. The amount of monomer is not critical but sufficient should be added to form the desired molecular weight chain on each phenol molecule. A suitable range is usually about 10% to 30% by weight.

The catalyst is a Lewis acid or a Friedel-Crafts catalyst such as aluminum chloride, stannic chloride/acetic acid, boron trifluoride, titanium chloride or other acid catalyst of this type such as $AlBr_3$, $SbF_5$, $SbCl_5$, $PF_5$ or $FeCl_3$. In some cases, particularly with stannic chloride, an acid is desirably added as cocatalyst, e.g. acetic acid, a phenol or HCl; or a small amount of water can be present to give an increased reaction rate. The concentration of catalyst is preferably chosen so that the reaction is largely complete in a few minutes or less. A convenient range for the catalyst concentration is from about 0.05% to about 3% by weight, but this is not critical. The concentration range for the cocatalyst is usually about 0.05% to 1%.

The polymerization is conveniently carried out in an aprotic solvent as reaction medium. Suitable solvents include halogenated hydrocarbon solvents such as methyl chloride, methylene chloride, and ethyl chloride. Other such solvents which can be used are trichloroethylene and chloroform. The reaction temperature should be below 0° C so that the polymer tail attached to the phenol is of sufficient length, with a preferred temperature range being from −20° to −80° C. Depending on the catalyst system, monomer, temperature and other variables, the polymerization will have progressed to suitable molecular weight range usually within about 30 to 600 seconds from the addition of the catalyst. Preliminary tests will indicate when the reaction should be terminated or has been completed to give the desired molecular weight. Usually some excess of monomer is present so that the reaction should be terminated before the molecular weight becomes too high. Alcohol addition is a convenient way to terminate the reaction and if sufficient is added will also cause precipitation of the phenol-polymer product. Lower alkanols are particularly suitable for this purpose, i.e. methanol, ethanol, propanol. Other precipitants for the product are possible, such as petroleum ether with the styrene polymerization.

The molecular weight of the polymer tail can be determined for example by vapor pressure osmometry and gel permeation chromatography. Preferably the molecular weight of the polymer tail is about 2000 to about 3500 for a balance of antioxidant activity and immobility in the matrix polymer. We have shown that the polymer tail is attached to the ring by UV, IR and NMR analysis and by electron spin resonance analysis of the phenol-polymer product oxidized with lead dioxide. The weight percent of the product which is the phenol moiety can be determined by UV and IR analysis. The % by weight phenol moiety content will usually range from about 5% to about 15% depending on the molecular weights of each moiety.

The phenol-polymer product has been found to be an effective antioxidant. The volatility is very low and the relatively long polymeric tail effectively immobilizes the product when incorporated in a matrix or base polymer even at above normally-encountered temperatures. The base material is able to be protected from oxidation at elevated temperatures where prior antioxidants have gradually been lost. Base materials with which the product is effective as an antioxidant include rubbers (both natural and synthetic), polyolefins and plastics such as polystyrene. For instance, the antioxidants of this invention would be expected to protect polyethylene or polypropylene at temperatures of the order of 140° C. The loading or amount of the antioxidant product required will be slightly higher than for the low molecular weight phenolic antioxidants. Since the phenol-polymer antioxidant will be retained in the matrix for a prolonged period, no safety margin or excess amount need be used to compensate for gradually lost antioxidant as with low molecular weight phenolic antioxidants. Thus based solely on the weight of phenol moiety present somewhat lesser amounts than have been customarily added, would be acceptable. The amount of phenol-polymer antioxidant added will usually be from about 1% to about 4% by weight of the mixture.

The following Examples are illustrative and not exhaustive.

EXAMPLE 1

To a solution containing 50 ml isobutene, 100 ml methylene chloride, 10 g 2,6-di-t-butylphenol and 0.5 g acetic acid at −78° C, was added 5 g stannic chloride dissolved in 10 ml methylene chloride. After 5 minutes polymerization, 200 ml ethyl alcohol was added and the phenol-polymer product separated as an oil. The product was separated and purified by redissolving in methylene chloride and reprecipitating with ethanol. Low molecular weight material was removed by heating to 50° C in vacuo for 1 hour. The phenol moiety content of the product was about 12% by weight with the polymer tail consisting of polyisobutene of molecular weight about 2000. It was confirmed that the polyisobutene was attached in the 4-position.

EXAMPLE 2

To a solution containing 10 g 2,6-di-t-butylphenol and 50 ml styrene in 100 ml methylene chloride at −78° C, was added 20 ml of a saturated solution of aluminum chloride in methylene chloride. After five minutes polymerization time, 200 ml ethyl alcohol was added and the phenol-polymer product isolated as a white solid. Low molecular weight material was removed by heating to 50° C in vacuo for 1 hour. The polymer tail consisted of polystyrene of molecular weight about 3500.

EXAMPLE 3

To a solution containing 10 g 2,6-di-t-butylphenol, 50 ml isobutene, 50 ml styrene in 100 ml methylene chloride at −78° C was added 20 ml of a saturated solution of aluminum chloride in methylene chloride. After 5 minutes polymerization time, 200 ml ethyl alcohol was added and the phenol-polymer product separated and heated to 50° C in vacuo for 1 hour. The glassy product was a copolymer of isobutene and styrene bound to about 7% phenolic moiety end groups.

EXAMPLE 4

8 g of di-t-butylphenol was charged to a dry 32 oz polymerization bottle and the bottle was capped. 60 g of isobutylene was charged from a pressure burette; the bottle was placed in dry ice - acetone bath and allowed to cool. 184 g of methyl chloride was charged from a pressure burette. After allowing time for the mixture to cool, 0.12 g of aluminum chloride, in the form of a 0.4 weight % solution in methylene chloride, was charged with a syringe. The polymerization bottle was shaken vigorously for a few seconds and then returned to the cooling bath. The resultant solution was poured gradually, with stirring, into excess ethanol and the resulting liquid polymer precipitate was washed twice with excess ethanol. The product was dried under vacuum at 80° C. The polymer yield was 68%.

The phenol-polymer product was a viscous liquid having an intrinsic viscosity in toluene at 30° C of 0.159 dl/g. The viscosity at 25° C, measured with a Brookfield viscometer, was 12,000 poise. The product showed a combined di-t-butylphenol content of 6.6 weight % by I.R. analysis.

EXAMPLE 5

The antioxidants of the invention have been evaluated in terms of their ability to delay the onset of surface embrittlement in SBR gum vulcanizates. For this purpose peroxide vulcanized styrene-butadiene rubber specimens were prepared and aged in air at 121° C. Compound recipes in parts by weight were prepared using a two roll lab mill as in Table 1. The phenol-polymer #3 was di-t-butylphenol-polyisobutene containing 13% phenol. The phenol-polymer #4 was di-t-butylphenol-polyisobutene containing 11% phenol.

though the thickness of the skin was sufficient to impart rigidity to the specimen as a whole. When placed in

TABLE 1

| Compound # | 1 | 2 | 3 | 4 | 5 | 6 | 7 | 8 |
|---|---|---|---|---|---|---|---|---|
| Polysar Krylene 1502[1] | 100 | 100 | 100 | 100 | 100 | 100 | 100 | 100 |
| Phenol-Polymer #3 | 3.5 | 7 | — | — | — | — | — | — |
| Phenol-Polymer #4 | — | — | 4 | 8 | — | — | — | — |
| Deenax[2] antioxidant | — | — | — | — | 0.5 | 1 | — | — |
| DiCup 40 C[3] | 1.25 | 1.25 | 1.25 | 1.25 | 1.25 | 1.25 | 0.35 | 0.5 |

[1]Trademark, Polysar Limited (styrene-butadiene rubber)
[2]Trademark, Exxon Chem. (2,6-di-t-butyl-p-cresol)
[3]Trademark, Hercules Powder Co. (60% calcium carbonate, 40% dicumyl peroxide)

Sheet specimens 2 × 2 × 0.03 inches were vulcanized in a laboratory press for 30 minutes at 160° C; these conditions being sufficient to decompose essentially all of the peroxide.

From each sheet, a specimen approximately 1 × ¼ inch was cut and retained. The remainder of each sheet was then suspended in a laboratory air oven at 121° C. After 4 hours, the sheets were removed and a second set of 1 × ¼ inch specimens was taken. This procedure was continued until specimens had been accumulated representing aging periods of 0, 4, 8, 16, 24 and 48 hours at 121° C.

The specimens were examined visually and manually with respect to surface embrittlement. They were also subjected to a swelling test in benzene so as to provide quantitative data relating to the average degree of crosslinking caused by oxidation. In the swelling test, the specimen was weighed in an analytical balance, then placed in an individual glass container and immersed in benzene (about 30 ml) for 24 hours at room temperature. The specimen was then removed, dried quickly with filter paper, then placed immediately in a glass-stoppered weighing vessel so as to determine the swollen weight (S). The specimen was then placed in a vacuum oven at 80° C until the benzene had been removed. The final weight of the specimen was recorded (F) and the Swelling Ratio, S/F, was calculated.

The results of manual inspection of the samples are given in Table 2.

TABLE 2

| | | Degree of Embrittlement | | | | | | | |
|---|---|---|---|---|---|---|---|---|---|
| | Compound | 1 | 2 | 3 | 4 | 5 | 6 | 7 | 8 |
| Aged (hr) | 0 | 0 | 0 | 0 | 0 | 0 | 0 | 0 | 0 |
| | 4 | 0 | 0 | 0 | 0 | 0 | 0 | 0 | 0 |
| | 8 | 0 | 0 | 0 | 0 | 0 | 0 | 1 | 1 |
| | 16 | 0 | 0 | 0 | 0 | 1 | 0 | 2 | 2 |
| | 24 | 1 | 0 | 0 | 0 | 2 | 2 | 2 | 2 |
| | 48 | 3 | 2 | 1 | 0 | 3 | 3 | 3 | 3 |

Note: 0 = none
1 = slight skin
2 = severe skin
3 = very severe, sample rigid

These observations show that the phenol-polymer antioxidants (Compounds 1-4) are clearly superior to the well-known antioxidant Deenax in delaying the oxidative crosslinking of styrene-butadiene rubber at 121° C in air.

The swelling data are given in Table 3.

The swelling behaviour is complicated, in this type of vulcanizate, by the fact that both oxidative scission and oxidative crosslinking occur. The crosslinking reaction ultimately predominates; an inelastic skin forms over the surface and grows gradually thicker, as aging progresses, until eventually the whole specimen is embrittled. In the present experiment, total embrittlement did not occur within 48 hours even in specimens 5 to 8. There remained an internal body of soft rubber even though the thickness of the skin was sufficient to impart rigidity to the specimen as a whole. When placed in benzene, the swelling pressure of the internal soft rubber was sufficient to break the skin, resulting in a disintegration of the specimen in the solvent. This circumstance prevents the determination of accurate swelling values. It is known from other experience that a further stage is ultimately reached, in which the specimen remains intact and shows very little swelling. This stage was not reached in the present tests.

TABLE 3

| | | Swelling Ratio (benzene) | | | | | | | |
|---|---|---|---|---|---|---|---|---|---|
| | Compound | 1 | 2 | 3 | 4 | 5 | 6 | 7 | 8 |
| Aged (hr) | 0 | 6.8 | 6.6 | 5.8 | 6.6 | 5.6 | 5.5 | 8.5 | 6.3 |
| | 4 | 6.7 | 6.9 | 5.9 | 7.1 | 5.9 | 6.0 | 11.3 | 8.0 |
| | 8 | 7.5 | 7.6 | 6.0 | 7.4 | 7.4 | 6.3 | 10.6 | 8.4 |
| | 16 | 7.3 | 7.3 | 6.4 | 8.0 | 6.6 | 6.8 | 8.0 | 6.5 |
| | 24 | 7.5 | 8.6 | 6.9 | 8.5 | 5.8 | 5.8 | 7.3 | 6.2 |
| | 48 | 6.5 | 5.0 | 5.8 | 8.3 | * | * | * | * |

*samples disintegrated in solvent.

As may be seen by scanning the data, the overall swelling value tends to increase at first (i.e. — predominant oxidative scission) then decrease as the proportion of densely crosslinked skin becomes predominant. Comparing the results after 24 hours, it is seen that the swelling ratio values for samples 1 to 4 are still showing an overall increase, while those of samples 5 to 8 are already declining. After 48 hours, samples 1 to 4 are declining, but samples 5 to 8 have reached a more advanced stage of oxidation such that disintegration of the specimens takes place. Both observations show that the antioxidants of this invention are clearly superior to the Deenax-protected "control" specimens (5 and 6) and "blank" specimens (7 and 8).

One of the purposes in using swelling tests was to provide evidence on the initial states of cure. Peroxide vulcanization efficiency is reduced by antioxidants, hence less peroxide was used in the case of compounds 7 and 8. These two compounds represent two concentrations of dicumyl peroxide and, consequently, two initial states of crosslinking. The fact that their behaviour in terms of oxidative skin-formation was virtually identical shows that the variation in initial peroxide concentration and state of crosslinking is not a significant factor within the range represented by the compounds tested.

We claim:
1. A dialkylphenol antioxidant having attached to the phenol in the 4 or 6 position on the ring a vinylic polymer tail of molecular weight from about 1000 to about 5000 as determined by vapor pressure osmometry or by gel permeation chromatography, said vinylic polymer being in the form of a pendant chain attached to said ring at one end of the chain derived from vinyl monomers which polymerize cationically with an acid catalyst of the Lewis Acid or Friedel-Crafts type.

2. The dialkylphenol antioxidant of claim 1 wherein the alkyl groups are in the 2 and 6 positions.

3. The dialkylphenol antioxidant of claim 1 wherein the alkyl groups have from 2 to 8 carbon atoms.

4. The dialkylphenol antioxidant of claim 3 wherein the alkyl groups are tertiarybutyl or isopropyl.

5. The dialkylphenol antioxidant of claim 1 wherein the vinylic polymer is selected from the group consisting of polymers and copolymers of isobutene, styrene, propene, butene-1 and pentenes.

6. The dialkylphenol antioxidant of claim 1 having a polymer tail attached in the 4 position, said tail being polyisobutene.

7. The dialkylphenol antioxidant of claim 1 having a polymer tail attached in the 4 position, said tail being polystyrene.

8. The dialkylphenol antioxidant of claim 1 having a polymer tail attached in the 4 position, said tail being a copolymer of isobutene and styrene.

9. The dialkylphenol antioxidant of claim 1 wherein the polymer tail has a molecular weight of about 2000 to about 3500.

10. The dialkylphenol antioxidant of claim 1 wherein the phenol is a substituted diphenol or bisphenol.

11. A method of preparing a dialkylphenol antioxidant having a polymeric side chain tail comprising
(a) mixing a dialkylphenol antioxidant, a vinylic monomer able to polymerize cationically, a Friedel-Crafts or Lewis acid type catalyst, and an aprotic solvent for the mixture, the amount of monomer being sufficient to form the desired molecular weight polymer on each phenol molecule,
(b) polymerizing said monomer cationically at temperatures below about 0° C and stopping the polymerization when the polymer molecular weight is within the range of about 1000 to 5000 as determined by vapor pressure osmometry or by gel permeation chromatography, and
(c) recovering the dialkylphenol-bound polymer compound from the reaction mixture.

12. The method of claim 11 wherein the dialkylphenol has alkyl groups in the 2 and 6 positions.

13. The method of claim 11 wherein the alkyl groups have from 2 to 8 carbon atoms.

14. The method of claim 13 wherein the alkyl groups are tertiarybutyl or isopropyl.

15. The method of claim 11 wherein the vinylic monomer is selected from the group consisting of isobutene, styrene, propene, butene-1; and pentenes.

16. The method of claim 11 wherein the catalyst comprises one of aluminum chloride, and boron trifluoride.

17. The method of claim 11 wherein the polymerization temperature is from below about 0° C to about −80° C.

18. The method of claim 11 wherein the polymerization is stopped by addition of an alcohol.

19. The method of claim 18 wherein sufficient alcohol is added to precipitate the phenol-polymer compound.

20. The method of claim 11 wherein the solvent is selected from the group consisting of methyl chloride, methylene chloride and ethyl chloride.

21. The method of claim 17 wherein the temperature is of the order of about −80° C.

22. The method of claim 11 wherein there is added a cocatalyst selected from the group consisting of acetic acid, a phenol, HCl and water.

* * * * *